United States Patent [19]

Vidmar et al.

[11] Patent Number: 4,845,731
[45] Date of Patent: Jul. 4, 1989

[54] RADIATION DATA ACQUISTION

[75] Inventors: James F. Vidmar, Willoughby Hills; Richard A. Sones, Cleveland Heights, both of Ohio

[73] Assignee: Picker International, Cleveland, Ohio

[21] Appl. No.: 741,484

[22] Filed: Jun. 5, 1985

[51] Int. Cl.$^4$ .............................................. H05G 1/64
[52] U.S. Cl. ........................................ 378/98; 378/19; 378/146; 378/156; 361/398; 361/412; 361/413; 250/339; 250/370.08; 250/370.09
[58] Field of Search ............ 378/19, 5, 147, 156–157, 378/150, 185, 98, 146; 250/370 G, 370 GX, 385, 370 E, 366, 367, 339; 361/398, 412, 413, 415

[56] References Cited

U.S. PATENT DOCUMENTS

| | | |
|---|---|---|
| 4,029,963 | 6/1977 | Alvarez et al. ......................... 378/5 |
| 4,055,770 | 10/1977 | Milcamps et al. .................. 378/153 |
| 4,119,853 | 10/1978 | Shelley et al. ....................... 250/385 |
| 4,143,273 | 3/1979 | Richey et al. ....................... 378/150 |
| 4,149,081 | 4/1979 | Seppi .................................... 378/5 |
| 4,161,655 | 7/1979 | Cotic et al. ........................... 378/19 |
| 4,169,184 | 9/1979 | Pufahl ................................... 428/343 |
| 4,179,100 | 12/1979 | Sashin et al. .................... 250/370.09 |
| 4,181,856 | 1/1980 | Bone ..................................... 378/19 |
| 4,187,427 | 2/1980 | Cusano ................................. 378/19 |
| 4,190,771 | 2/1980 | Kamei et al. ....................... 250/385 |
| 4,220,860 | 9/1980 | Carlson et al. .................. 250/361 R |
| 4,223,970 | 9/1980 | Walter ................................... 439/82 |
| 4,234,792 | 11/1980 | DeCou et al. ..................... 250/361 R |
| 4,259,721 | 3/1981 | Kuznia .................................. 364/414 |
| 4,262,202 | 4/1981 | Cusano et al. ...................... 378/19 |
| 4,292,525 | 9/1981 | Tschunt ............................... 378/19 |
| 4,292,538 | 9/1981 | Carlson ........................... 250/361 R |
| 4,301,368 | 11/1981 | Riihimaki ............................ 250/385 |
| 4,338,521 | 7/1982 | Shaw et al. .................... 250/370.11 |
| 4,363,969 | 12/1982 | Ong ..................................... 250/367 |
| 4,380,820 | 4/1983 | Cutter .................................. 378/153 |
| 4,383,327 | 5/1983 | Kruger ................................. 378/19 |
| 4,395,636 | 7/1983 | Anger et al. ........................ 250/366 |
| 4,414,473 | 11/1983 | Hoffman et al. ............... 250/370.09 |
| 4,417,144 | 11/1983 | Hoffman et al. .................... 250/367 |
| 4,429,227 | 1/1984 | DiBianca et al. .................... 378/19 |
| 4,477,728 | 10/1984 | Rifn ..................................... 378/157 |
| 4,511,799 | 4/1985 | Bjorkholm ............................ 378/5 |
| 4,521,689 | 6/1985 | Pritzkow ............................. 250/367 |
| 4,543,482 | 9/1985 | Brenholdt ........................... 250/343 |
| 4,563,725 | 1/1986 | Kirby .................................. 361/412 |
| 4,571,495 | 2/1986 | Distler et al. ....................... 250/394 |
| 4,578,803 | 3/1986 | Macovski ............................ 378/156 |
| 4,626,688 | 12/1986 | Barnes ................................ 378/156 |
| 4,651,001 | 3/1987 | Harada et al. ...................... 250/330 |
| 4,709,382 | 11/1987 | Sones ................................... 378/5 |

OTHER PUBLICATIONS

"Flexible Circuits Bend to Designers Will", by Lyman Electronics, 9/15/77, 361/398.
AMP Connector Advertisement, Copyright 1974.
AMP Special Application Connectors, pp. 8–17 to 8–21, by AMP Incorporated, Harrisburg, PA.

Primary Examiner—Craig E. Church
Assistant Examiner—John C. Freeman
Attorney, Agent, or Firm—Watts, Hoffmann, Fisher & Heinke Co.

[57] ABSTRACT

A radiation imaging system is disclosed. A radiation source directs a thin spread beam of radiation toward a detector assembly which is aligned with the radiation beam. The detector assembly includes a printed circuit board having a bowed configuration and bearing board circuitry. An array of photodiode detector elements are attached to the board. The detector includes a front and a rear array of elements arranged one behind the other. The circuit board defines a slot between the front and rear arrays in which a radiation filter can be removably and slidably interposed. The detector elements are buried or recessed in outer surfaces of the circuit board to a depth sufficient to position contact fingers of the elements substantially flush with the unrecessed surface of the board. Radiation sensitive phosphor material is removably positioned over each of the respective front and rear detector element arrays.

28 Claims, 6 Drawing Sheets

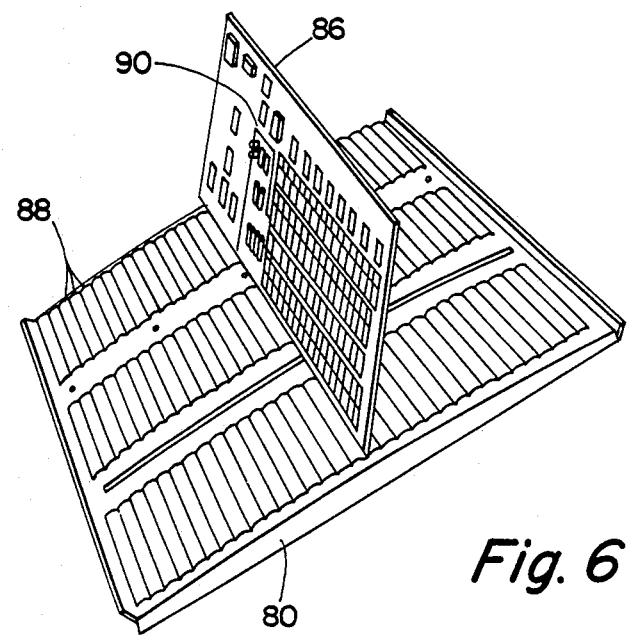
Fig. 6
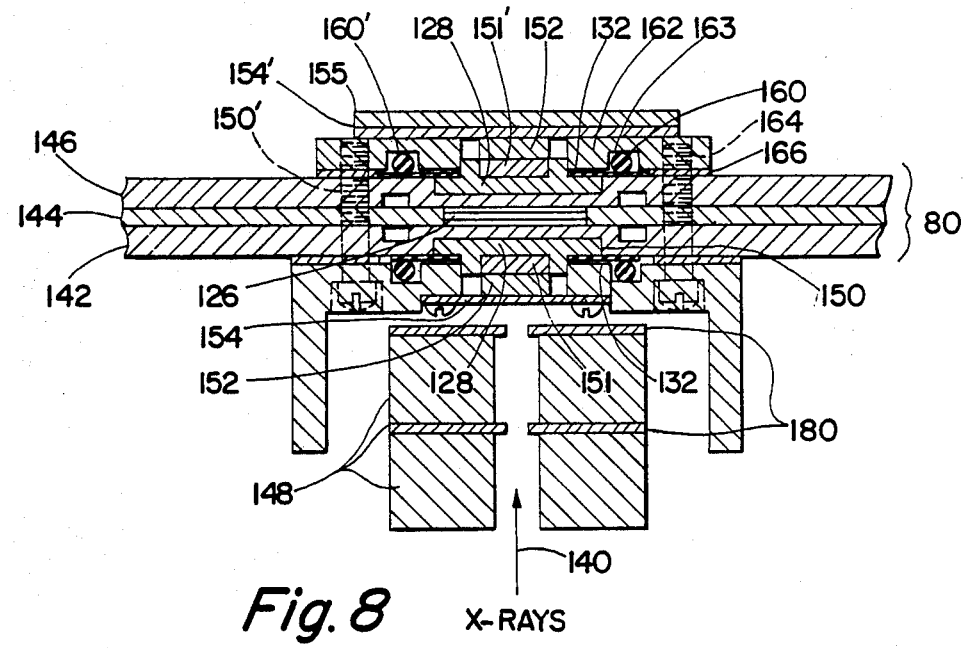
Fig. 8  X-RAYS

RADIATION DATA ACQUISTION

TECHNICAL FIELD

This invention relates to the field of medical diagnostic imaging and more particularly to an improved detector assembly for radiation data acquisition in radiation imaging, such as in digital radiography.

BACKGROUND ART

Radiography is a long known medical diagnostic imaging technique.

In a conventional radiography system, an x-ray source is actuated to direct a divergent area beam of x-rays through a patient. A cassette containing an x-ray sensitive phosphor screen and light and x-ray sensitive film is positioned in the x-ray beam on the side of the patient opposite the source. X-radiation passing through the patent's body is thereby attenuated in various degrees to produce on the film a shadow image of a portion of the patient through which the x-rays pass.

More recently, digital radiographic techniques and systems have been developed. In digital radiography the source directs x-radiation through a patient's body to a detector assembly located in the beam path beyond the patient. The detector produces electrical signals defining the radiation pattern emergent from the patient and incident on the assembly. These signals are then processed to yield a visual display of the image.

The detector assembly includes an elongated array of individual detector elements. A detector element can suitably comprise a scintillator material positioned in front of a photodiode. Each detector element responds to x-radiation incident on the phosphor to produce an analog electrical charge signal indicative of such radiation. The set of these analog electrical signals represents the radiation pattern emergent from the patient's body.

The analog signals are sampled and processed by imaging circuitry, primarily to improve their signal to noise ratio, and are subsequently digitized.

The digital signals are fed to a digital data processing unit. The data processing unit records and/or processes and enhances the digital data.

A display unit responds to appropriate digital data representing the image to convert the digital information back into analog form and to produce a visual display of the patient's internal body structure derived from the acquired image pattern of radiation. The display unit can be coupled directly to the digital data processing unit for substantially real time imaging, or can be fed stored data from digital storage means such as tapes or disks, representing patient images acquired in earlier studies.

Digital radiography includes techniques in which a thin spread beam of x-radiation is used. In practice of this technique, often called "scan (or slit) projection radiography" (SPR), the spread beam is scanned across the patient, or the patient is movably interposed between the spread beam x-ray source and the detector assembly, the detector array being maintained in continuous alignment with the beam. The relative movement effected between the source-detector arrangement and the patient's body scans a large portion of the body.

Discrete element detectors have been proposed comprising a single line of detector elements. Other proposals have included planar rectangular detector arrays of square detector elements.

Details of certain aspects of digital radiography systems such as described here are set forth in the following publications, hereby expressly incorporated by reference:

Mattson, R. A., et al, "Design and Physical Characteristics of a Digital Chest Unit", S.P.I.E. Volume 314, *Digital Radiography* (1981);

Arnold, B. A. et al "Digital Radiography: An Overview" *Proceedings of S.P.I.E.* Volume 273, March 1981;

Kruger, R. A. et al "A Digital Video Image Processor for Real Time X-ray Subtraction Imaging" *Optical Engineering*, Volume 17, No. 6 (1978);

U.S. Pat. No. 4,383,327, issued on May 10, 1983, to Kruger.

European patent application Publication No. EP 0115125-A1, published Aug. 8, 1984, by Gary L. Barnes and entitled "Split Energy Level Radiation Detection";

U.S. patent application Ser. No. 542,384, filed Oct. 17, 1983 by Mattson, R. A., et al entitled "Improving Signal Characteristics in Digital Scan Projection Radiography", and owned by the assignee of this application.

U.S. patent application Ser. No. 653,955, filed by Sones, et al. on Sept. 21, 1984, entitled "Digital Radiography Detector Resolution Improvement" and owned by the assignee of this application.

U.S. patent application Ser. No. 673,779, filed on Nov. 21, 1984 and entitled "Imaging With Focused Curved Radiation Detectors" and owned by the assigneed of this application.

An important technique for enhancing a digitally represented image is called "subtraction". There are two types of subtraction techniques, one being "temporal" subtraction, the other being "energy" subtraction.

Temporal, sometimes called "mask mode" subtraction, is a technique that can be used to remove overlying and underlying structures from an image when the object of interest is enhanced by a radiopaque contrast agent. Images are acquired with and without the contrast agent present and the data representing the former image is subtracted from the data representing the latter, substantially cancelling out all but the blood vessels or anatomical regions containing the contrast agent.

A principal limitation of digital temporal subtraction is the susceptibility to misregistration, or "motion artifacts" caused by patient movement between the acquisition of the images with and without the contrast agent.

An alternative to temporal subtraction, which is less susceptible to motion artifacts, is energy subtraction. Whereas temporal subtraction depends on changes in the contrast distribution with time, energy subtraction exploits energy-related differences in attenuation properties of various types of tissues, such as the difference of the attenuation characteristics of soft tissue and bone.

Soft tissue shows less change in attenuation capability with respect to energy than does bone.

This phenomenon enables performance of energy subtraction. In practicing that technique, pulses of x-rays having alternating higher and lower energy levels are directed through the patient's body. When a lower energy pulse is so generated, the detector and associated digital processing unit cooperate to acquire and store a set of digital data representing the image produced in response to the lower energy pulse. A very short time later, when the higher energy pulse is produced, the detector and digital processing unit again similarly cooperate to acquire and store a separate set of digital information representing the image produced by the higher energy pulse. The values obtained representing the lower and higher energy images are then processed in accordance with techniques described in the following publication, hereby incorporated by reference: Lehmann, L. A. et al, "Generalized Image Combination in Dual KVP Digital Radiography" *Medical Physics* Volume 8, pp. 659–667 (1981). By processing in this manner, the image contrast and visibility of different tissues is substantially enhanced.

Energy subtraction has the advantage, relative to temporal subtraction, of being substantially not subject to motion artifacts resulting from the patient's movement between exposures. The time separating the lower and higher imaging acquisitions is quite short, often less than one sixtieth of a second.

An important disadvantage in dual energy subtraction techniques results from the necessity of rapidly alternating the output of an x-ray tube between high and low levels. This requirement gives rise to severe problems in a practical clinical device. The switching frequency is required to be on the order of 500 Hz. and insufficient photons (x-ray energy) result when even the highest capacity x-ray tubes are combined with realistically narrow x-ray beam slit widths and rapid scanning rates.

In order to eliminate this problem, a detector assembly has been proposed which enables the practice of energy subtraction radiography with the use of a constant output x-ray source.

In accordance with this proposal, an example of which is described in the above incorporated Barnes published European patent application, a dual layer dual energy radiation detector assembly has been suggested. A first layer comprises a rectangular planar array of square detector photodiode elements including a first radiation sensitive scintillation material overlying the photodiodes and being selected for its primary response to radiation of a lower energy range. A second planar layer is located, or "stacked", directly behind the first layer, with respect to the x-ray tube, and comprises a similar rectangular array of detector elements congruent and aligned with the first layer. The second layer includes a second radiation sensitive scintillation material selected for its propensity to respond primarily to radiation of a higher energy level, which has passed through the first layer substantially without being detected.

Such a dual energy detector structure, when used in conjunction with an x-ray tube emitting energy over a wide range, will provide data describing two separate images, i.e., one an image of lower energy x-radiation passing through the subject, the other being an image describing the pattern of higher energy radiation.

The Sones patent application referred to above describes the use of curved arrays of detector elements in digital radiography applications. One of the problems of this technology involving curved arrays relates to providing mechanical structure for holding the arrays in their desirable fixed curved geometrical relationship. In the past, independent support structure was proposed, whose only function was to provide mechanical stability.

The difficulty of maintaining the proper geometrical relationship among the detector elements becomes exacerbated in situations in which dual layer detectors are employed, because of the additional complexity of these detector arrangements. It was required to provide support structure which was both compatible with the necessary geometrical relationships to be maintained among the detector elements, and did not interfere with system operation, and which provided sufficient sturdiness to maintain detector element alignment in normal use. This situation was further complicated by the need for moving the entire detector assembly in synchronism with the thin spread beam of x-rays.

It has been proposed in computed tomography applications to employ scintillation detector elements electrically, but not mechanically, connected to printed circuitry on boards, which circuitry performs part of the image processing of signals produced by the detector elements.

The usual proposal was to couple the scintillator elements to the printed circuitry by soldered or welded terminals, or by plugs. Problems exist with connection by solder or welding. Each terminal coupling must be made individually, often by hand, a process which is tedious and costly.

Once made, such couplings could not be disassembled without destroying the coupling means, i.e., the soldered or the welded connections. This means that assemblies including such connections are difficult to repair, in that, after the repair, the couplings must be remade in their entirety.

Additionally, the brittle nature of the couplings thus made introduces durability problems wherever movement or vibration is present.

The use of plugs as connectors, while more easily disassembled than welded or soldered connections, results in the plugs taking up significant portions of the circuit board surface, which limits the placement of board circuitry, sometimes increasing the difficulty of producing the appropriate circuit boards.

Another type of problem arises from the use of radiation detector assemblies incorporating filters and phosphor materials, such as described in the Barnes published European application, is that the phosphor material and filters are permanently fastened in place when the detector assembly is manufactured. Such assemblies have no facility for simply changing phosphor or filter materials, and thus cannot be easily "tuned" for different types and levels of radiation, and for different types of studies.

DISCLOSURE OF INVENTION

The problems and disadvantages of the prior art are eliminated or reduced by the use of a digital radiography system incorporating improved aspects of detector assembly, structure and circuitry constituting embodiments of the present invention.

A digital radiography system suitable for incorporation of embodiments of the present invention includes a radiation source for producing a beam of radiation, and a detector assembly spaced from the source and aligned with the beam. In accordance with one feature of the invention the detector includes an array of individual detector elements comprising photodiodes affixed to a portion of circuit board material bearing on its surface circuitry for contributing to the processing of signals from the detector elements. The circuit board material to which the individual photodiodes are affixed is sufficiently mechanically rigid to afford means for supporting the detector elements in their mutual geometrical relationship when the elements are affixed to the board. Thus, the circuit board performs not only its normal function of being a substrate for bearing printed circuitry for use in connection with the detector elements, but also itself provides some mechanical support needed to maintain the desired geometrical configuration of the detector element array.

In accordance with a more specific aspect of the invention, the circuit board surface defines a curved configuration for use when curved arrays of detector elements is desired.

In accordance with another specific aspect, the individual detector elements include built-in electrical contacts, and are "buried" in troughs defined in the circuit board surface, to a degree sufficient to position the contacts of the photodiodes at a location substantially flush with the surface of the circuit board. This feature both improves the mechanical soundness of the assembly, and facilitates connection of the detector element contacts to the circuitry on the board surface, in a novel way that will be described in more detail later.

In accordance with a more specific embodiment, the detector assembly incorporates both a front and a back detector array, arranged one behind the other. In such an embodiment, a laminated circuit board structure is employed, with a groove or trough defined in two of the laminates for accommodating a respective one of the detector arrays.

In this specific embodiment, a slot is also defined midway through the laminated board structure, and parallel to its major surfaces, suitable for slidably receiving a portion of radiation filtering material, such as copper. This structure thus provides for removably holding the filter material interposed between the two arrays, and facilitates easy removal by an operator and the substitution of other types and thicknesses of radiation filter materials. This in turn facilitates tuning the detector assembly to various types and intensities of radiation and to various desired studies.

According to another specific embodiment, the invention includes means for removably positioning phosphor scintillation material in operative relationship with the detector arrays. In one embodiment, this function is performed by adhesively attaching a portion of scintillation material to a resilient member, such as an elongated portion of foam tape. The foam tape can then be adhesively applied to position the phosphor material in line with the light receiving faces of the individual photodiodes. This feature further enhances the susceptibility of the invention system for tuning to various radiation conditions and for various studies. The phosphor material can be easily removed and substituted by the operator on site, without need for extensive disassembly of the equipment.

The invention also includes features relating to effecting electrical coupling between detector element contacts and terminals of the circuitry borne on the surface of the circuit board. In accordance with one such feature, contact terminals of the board circuitry are located on the surface of the board, in an intermediate or middle portion thereof, as opposed to along the edge. The detector element contacts are positionable such that they can be aligned in one-to-one registration with the board circuit contacts when the detector elements are seated in their buried position in the groove defined in the board. Contact between the circuit terminals and the detector contact leads is effected solely by a pressure exerting arrangement.

More specifically, the pressure exerting contact is maintained by placing the respective contacts and terminals adjacent one another in alignment, and by holding a portion of resilient insulative material impinging against the detector element contact leads, continually maintaining the pressure against the circuit terminals. An elongated clamping structure is provided for maintaining in place the resilient insulative element to assure a durable and effective contact.

An important advantage of this structure resides in the fact that no additional electrically conductive material is interposed between the detector element contacts and the circuit terminals. Thus, this structure eliminates the need for soldering, welding, or other form of provision for maintaining the electrical contact. At the same time, the detector leads can be easily separated from the circuitry terminals for repair or replacement of detector elements, by merely loosening the clamping structure and removing the resilient insulative member. The resilient insulative member has a particular facility for providing a firm and continuous contact, which is particularly vibration resistant, enhancing the durability of the circuitry connections. Moreover, with this arrangement, there is no interference with placement of board circuitry on both opposite surfaces of the circuit board.

It is a general object of the present invention to provide a rigid and durable detector assembly including a dual layer array of detector elements firmly affixed to a circuit board bearing on its surface circuitry operable in cooperating with the detector elements the assembly having facility for tuning of the detector by easy replacement of phosphor and filter components, and for effecting good quality durable electrical contacts between detector elements and board circuitry while still facilitating easy disassembly of electrically coupled detector assembly components.

BRIEF DESCRIPTION OF THE DRAWINGS

FIG. 6 is a perspective drawing illustrating a portion of the embodiment shown in FIG. 5;

FIG. 8 is a cross-sectional side view, showing details of a portion of the system illustrated in FIGS. 6 and 7.

BEST MODE FOR CARRYING OUT THE INVENTION

Figure 1:
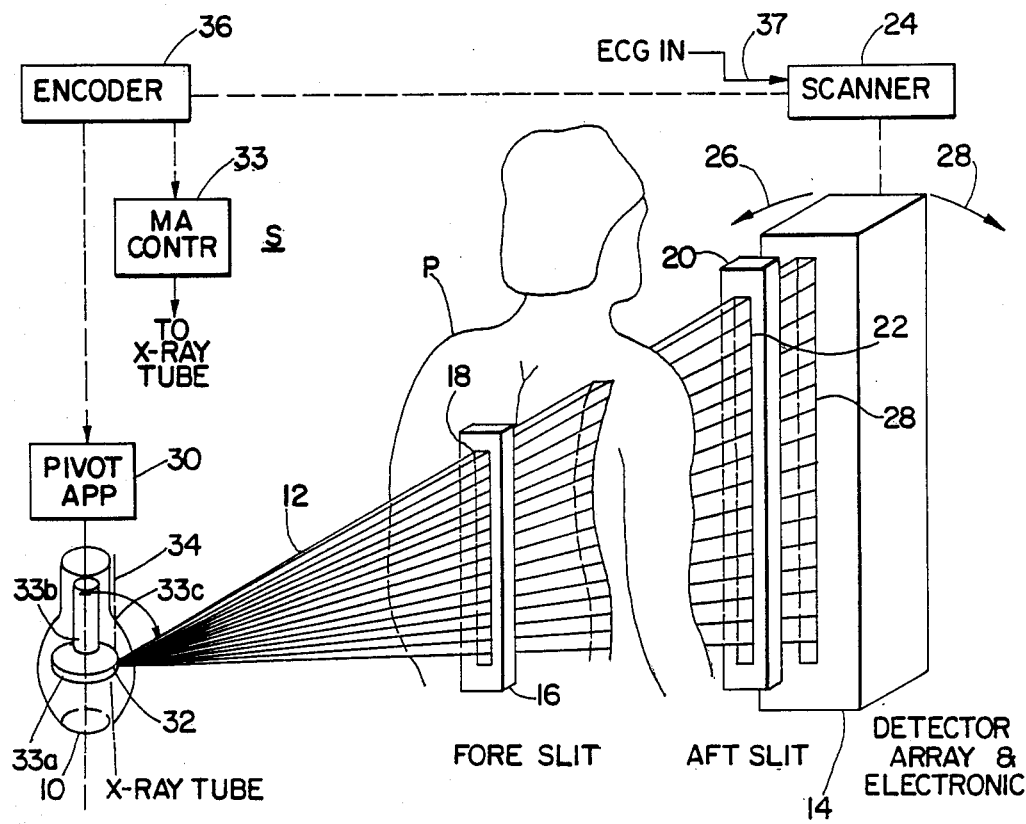
FIG. 1 is a partially pictorial and partially block drawing illustrating generally a radiographic imaging system incorporating the present invention.

A system S for performing digital scan projection radiography (SPR) is illustrated in general form in FIG. 1. The system S directs a pattern of x-rays through a patient P and produces, from information borne by the x-ray pattern emergent from the patient's body, a representation, generally in the form of a visible image, describing internal structure or condition of the patient's body.

The system S incorporates an x-ray source 10 for directing a beam of x-ray energy illustrated as a collection of rays 12 through the patent P and onto a detector assembly, shown very generally at 14, and described in more detail below. A first collimator structure 16 defines a generally vertical fore slit 18 for collimating the x-rays emanating from the source into a spread beam lying generally within a vertical plane. A second collimator structure 20 defines an aft slit 22 located between the patient and the detector assembly, aligned with the fore slit and with the detector, for enhancing this collimation.

Mechanical structure (not shown) maintains a mutually constant relative alignment between the collimators 16, 20, the x-ray source 10 and the detector assembly 14.

In the preferred embodiment, mechanical means is provided for scanning the collimators and detector in unison relative to the patient's body in a manner described in more detail below.

The mechanical structure can suitably comprise a gantry structure of known configuration which physically holds the collimators and detector in a rigid alignment, and mechanical scanner drive means 24 to move the entire gantry to effect scanning. Alternately, the components can be coupled to individual drive mechanisms, and servo techniques can be employed in known fashion to maintain the desired alignment during scanning motion.

In the preferred embodiment, the mechanical scanner drive apparatus 24 is coupled to the detector assembly 14 to move the detector along a generally arcuate path defined by the arrows 26, 28. The arcuate path is centered about a vertical axis 34 through a focal spot 32 of the tube 10, described in more detail below.

Pivoting apparatus 30 is coupled to the x-ray source. The apparatus 30 pivots the source, synchronously with detector and collimator arcuate motion, to continuously track the detector 14 and the mutually aligned collimators 16, 20.

The x-ray source 10 comprises an x-ray tube, and associated power circuitry (not shown) for electrically actuating the tube to produce x-rays (in pulsed or continuous mode) emanating from the focal spot 32 defined by the structure of the tube. Tube 10 produces x-rays by directing a stream of electrons onto an anode 33a of the tube, the anode rotating about an axis 33b. The pivoting motion effected by the pivot apparatus 30 causes the tube to pivot about the vertical axis 34 extending through the focal point 32.

The axis 33b of the rotatable anode 33a is, in the FIG. 1 embodiment, approximately parallel to the vertical axis 34 through the focal spot, the axis 34 being the axis of detector scanning as well, about which the arcuate detector path is centered.

In some instances, it is desirable to tilt the axis 33b slightly, generally clockwise as shown in FIG. 1, with respect to the axis 34, by about 8 degrees, or a similar small amount.

This tilting optimizes the configuration of the pattern 12 of x-rays which emanate from the tube and propagate through the collimator slits 18, 22. More specifically, the tilt angle is chosen to maximize the uniformity of x-ray energy passing through all portions of the slits 18, 22. The tilting is desirable for uniformity maximization because the x-ray energy produced by the tube 10 varies inherently with the angle 33c from the axis 33b at which energy emanates, and the degree of nonuniformity varies over the range of such angles. This is often called the "heel and toe effect" of the tube. The tilting angle is selected to enable the projection of energy through the slits 18, 22 from that range of angles 33c over which the x-rays are most uniform.

It is believed preferable to couple the detector assembly 14 to the master drive of the scanner apparatus and to control the tube and collimators to follow, since detector positioning is more critical than tube positioning.

An encoder 36 is coupled to the scanner apparatus 24 and produces a signal indicating the instantaneous position of the detector 14 along its arcuate path described by the arrows 26, 28. The output of the encoder 36 is directed to the pivot apparatus 30 for synchronizing the pivoting motion of the x-ray tube 10 with the arcuate motion of the detector 14 and collimators 16, 20, to maintain continuous alignment between the x-ray beam, collimators and detector assembly during scanning motion.

An example of a type of encoder apparatus is described in U.S. Pat. No. 4,015,129, issued on Mar. 29, 1977 to Manring et al., incorporated expressly here by reference, and owned by the assignee of the present application.

The scanner apparatus can be appropriately gated by a physiological signal, such as by an ECG signal 37, or by a signal indicating timing of administration of a contrast agent. Temporal subtraction studies can also be done, with sufficiently rapid retrace between scans.

The encoder 36 may also be coupled to a current control 33 of the x-ray tube 10. The encoder can adjust the tube current and hence, the intensity of x-ray output, as a function of the location of the detector along its scanning path. In the embodiment described here, the tube current can be controlled to decrease as a function of the degree of detector displacement from the center position along its scanning path. Thus, where the patient's body is less thick, i.e. near its right and left sides, x-ray output is reduced to maintain a more uniform x-ray flux at the detector throughput its scan.

The detector assembly 14 includes an array of individual detector elements, generally arranged within an elongated slot 28 defined by the detector assembly 14. The structure and arrangement of the detector elements is described in detail below. Each of the detector elements responds to light energy (generated by x-rays as described below) to produce an analog electrical signal, such as a charge, which represents a characteristic of the x-ray which caused the production of the electrical signal.

In operation, the detector, collimators and x-ray tube are moved to the left as in the direction illustrated by the arrow 26 to prepare for a scan. In performing a scan, the x-ray tube 10 is actuated to produce x-ray energy. The scanner apparatus 24 and pivot apparatus 30 cooperate to synchronously scan the vertical spread beam of x-rays from left to right as shown in FIG. 1 across the patient's body. During this scanning motion, the elements of the detector assembly 14 produce the analog electrical signals.

Analog detector outputs from each of the detector elements are periodically sampled. Each sampling produces analog signals representing a portion of image information. Over the course of the scan from one side to the other side, signals are developed describing a plurality of image lines, which together constitute an area image of the patient's internal body structure.

The electrical signals are then digitized and processed to produce the desired patient imaging.

Figure 2:
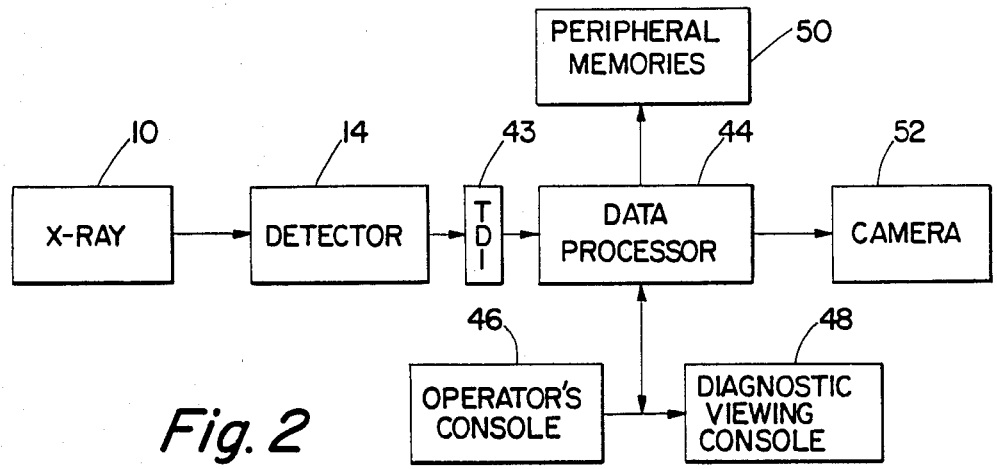
FIG. 2 is a block diagram illustrating electronic and other primary components of the system of FIG. 1.

FIG. 2 illustrates a generalized block diagram of the system of FIG. 1. In FIG. 2, the x-ray source 10 directs x-rays to the detector assembly 14. In an optical embodiment utilizing multiple rows and columns of detector elements in the detector assembly, the individual detector elements of the detector assembly 14 are mutually coupled to and associated with time delay and integrate (TDI) circuitry 43 which executes shift and add operations on the detector outputs in synchronism with detector scanning motion to produce image indicating analog signals with enhanced signal-to-noise ratio. Enhanced signals from the TDI circitry 43 are then transmitted to a data processor 44 which digitizes and processes the electrical signals. In response to commands from an operator's console 46, the data processor 44 produces in known fashion various types of representations of internal body structure of the examined patient. In one mode, the data processor actuates a diagnostic viewing console 48 to produce directly a visible image of the patient's internal body structure which can be immediately employed by a radiologist for medical diagnostic purposes.

In another mode, the data processor 44 stores digital information representing patient image data in one or more peripheral memories 50. Optionally, a camera 52 can be coupled to the data processor, for taking photos of images on the viewing console.

Figure 3:
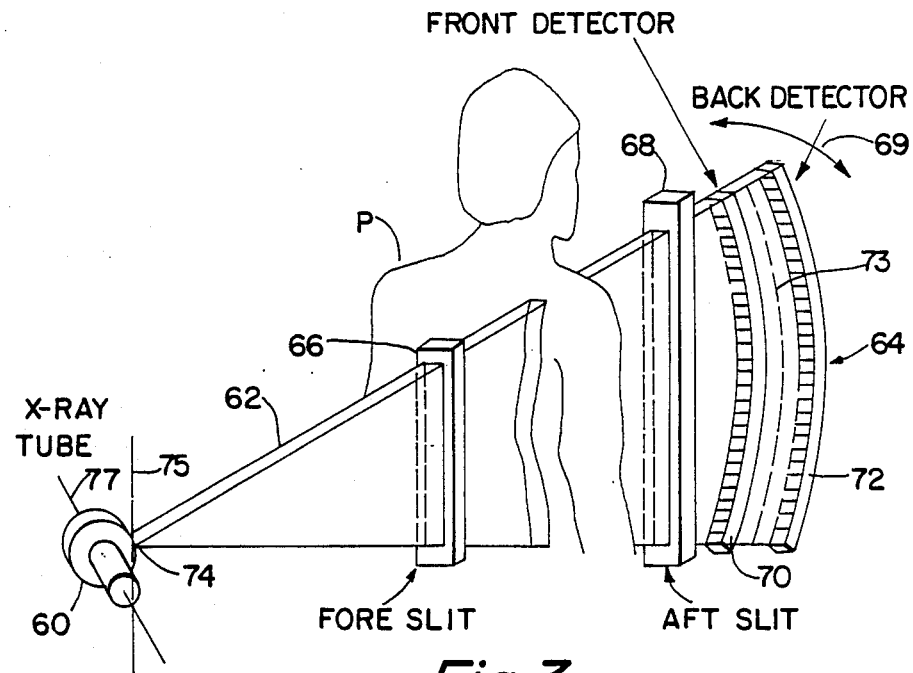
FIG. 3 is a pictorial representation of components of the system shown in FIG. 1.

FIG. 3 shows one embodiment of a focused detector. FIG. 3 illustrates an x-ray tube 60 directing a spread beam of x-rays 62 through a patient P toward the detector arrangement 64. Fore and aft collimators 66, 68 defining aligned collimator slits are also illustrated. The remainder of the system described above is omitted for simplicity and clarity.

The detector includes a first (front) array 70 of detector elements and a second (back) array 72 of detector elements located behind the first array with respect to the x-ray tube. Both the first and second arrays are aligned with the fore and aft slits. Radiation from the x-ray tube falls upon, and is partially absorbed by, the first array, and the remainder of the radiation, passing through the first array, falls upon and is detected by the second array. In this way, separate dual energy response is obtained, as explained in the Barnes published application incorporated above.

Each of the arrays in this embodiment includes a single line of detector elements arranged along an arcuate path defined by a portion of a circle having its center located at a focal spot 74 of the x-ray tube.

The detector arrays scan along arcuate paths concentric with the path indicated by the arrows 69. The concentric paths are centered about a vertical scanning axis 75 extending through the tube focal spot 74. The tube anode rotates about an axis shown at 77. The axis 77 is approximately perpendicular to the scanning axis 75.

This geometry reduces the nonuniformity of the x-ray energy across the beam set 62 propagating through the collimators 66, 68, by eliminating the effect of the "heel and toe effect" characteristic of the x-ray tube. According to the heel and toe effect, as discussed above, the x-ray energy from a tube varies as a function of the angle of x-ray emission with respect to the axis of anode rotation. Such radiation is far less a function of the angle of x-ray propagation taken radially with respect to the anode rotative axis.

In the FIG. 3 embodiment, the axis 77 is also tilted slightly from the perpendicular, with respect to an approximate plane defined by the aligned collimators 66, 68 and detector array layers 70, 72. The amount of tilting is about 8 degrees from the perpendicular to the plane so defined. The tilting is desirable for reasons analogous to those explained with respect to the tube tilting in FIG. 1.

Each detector element comprises a photodiode. Overlying each photodiode is a scintillation material responsive to x-rays to produce visible light energy.

Preferably, the scintillation material used in connection with the first array differs from that used in connection with the second array. The scintillation material associated with the first array is selected for its ability to preferentially absorb and produce light in response to x-rays from the source falling within a relatively low energy range. The higher energy x-rays pass, for the most part, through the first array and fall on the second array, causing the scintillation material associated with the second array to produce light which is detected by the individual detector photodiodes of the second array. Suitable types, thicknesses and physical configurations of the scintillation material are defined in the above incorporated Barnes published European patent application.

The preferred detector embodiments of this invention described suitably include a radiation filter, made of copper or brass sheet or other similar material, located at the region indicated by reference character 73, to "harden" the radiation energy reaching the second detector layer or array. Such filter elements are used to improve energy discrimination between the two detector layers in ways as are described in the above incorporated Barnes published European patent application.

The scintillation or phosphor material used in conjunction with the individual photodiode arrays discussed herein can suitably comprise a uniform single portion or layer of phosphor material overlying the entirety of the photodiode array without breaks or interruptions in its surface. Thus, the configuration of this embodiment forms a uniform smooth curved surface which comprises the energy receiving face of the detector array.

In another embodiment, each detector element photodiode can be provided with its own individual portion of scintillation phosphor material, rather than the entire array being covered with a single piece of such material. In this latter embodiment, the individual receiving faces of each of the detector elements, with their scintillators, collectively form a curved surface which is approximately smooth.

Known electronic and/or software correction means can be used to compensate, if need be, for any nonuniformity of transmission characteristics through the front detector array. This correction means can be associated with data processor 44.

Figure 4:
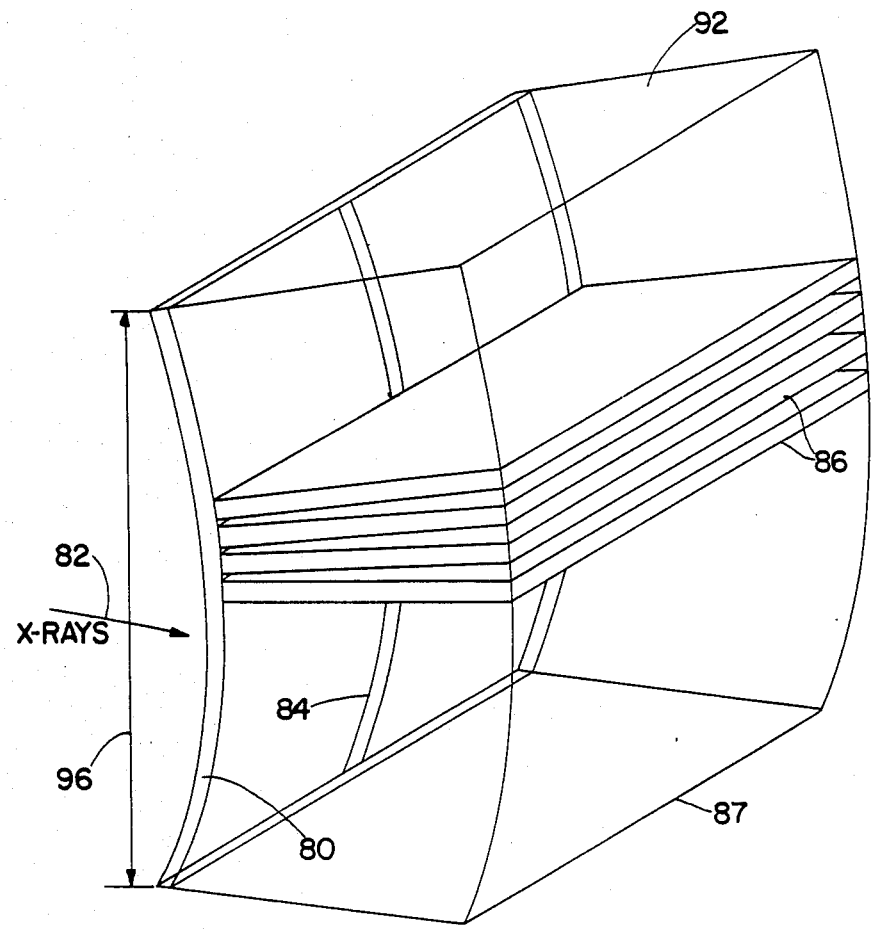
FIG. 4 is a generalized perspective view illustrating a portion of the system of FIG. 1.

FIG. 4 illustrates in generalized form a portion of the internal assembly of the detector unit 14. The detector unit includes a motherboard 80. The motherboard 80, as shown in FIG. 4, is held by supporting rib structure (not shown) in curved configuration defining a portion of the surface of a cylinder, the concave surface of the motherboard facing x-rays from the source, whose path is generally indicated by an arrow 82. The cylinder, a portion of whose surface is defined by the motherboard, has a substantially horizontal axis.

The motherboard 80 defines a recessed trough portion 84 which accommodates the detector elements and some associated electronic and scintillation components, along with other mechanical components which will be described in greater detail below. It is important to note that in this embodiment the individual detector elements of the detector unit 14 are distributed in a curvilinear fashion along the recessed portion 84 of the curved motherboard 80.

The motherboard 80 also bears printed circuitry which is coupled to receive and respond to signals from the individual detector elements in a manner described in more detail below.

In the preferred embodiment, the detector element array includes two linear arrays, one front and one back, each having 1,024 detector elements, arranged along the curved motherboard in the recessed or troughed region 84.

The detector assembly 14 also includes a plurality (32, in the preferred embodiment) of "daughterboards" 86. Each of the daughterboards 86 bears additional printed circuitry for coupling and cooperation with the printed circuitry borne by the motherboard 80. The printed circuitry borne by the motherboard 80 and the daughterboards 86 comprises preamplification and amplification circuitry for processing and amplying signals from the detector elements to prepare these signals for further processing by the system. In view of the fact that the amplification and preamplification circuitry can comprise any of a number of specific circuitry embodiments whose design is within the ordinary skill of the art, the precise nature of that circuitry will not be discussed here.

Figure 9:
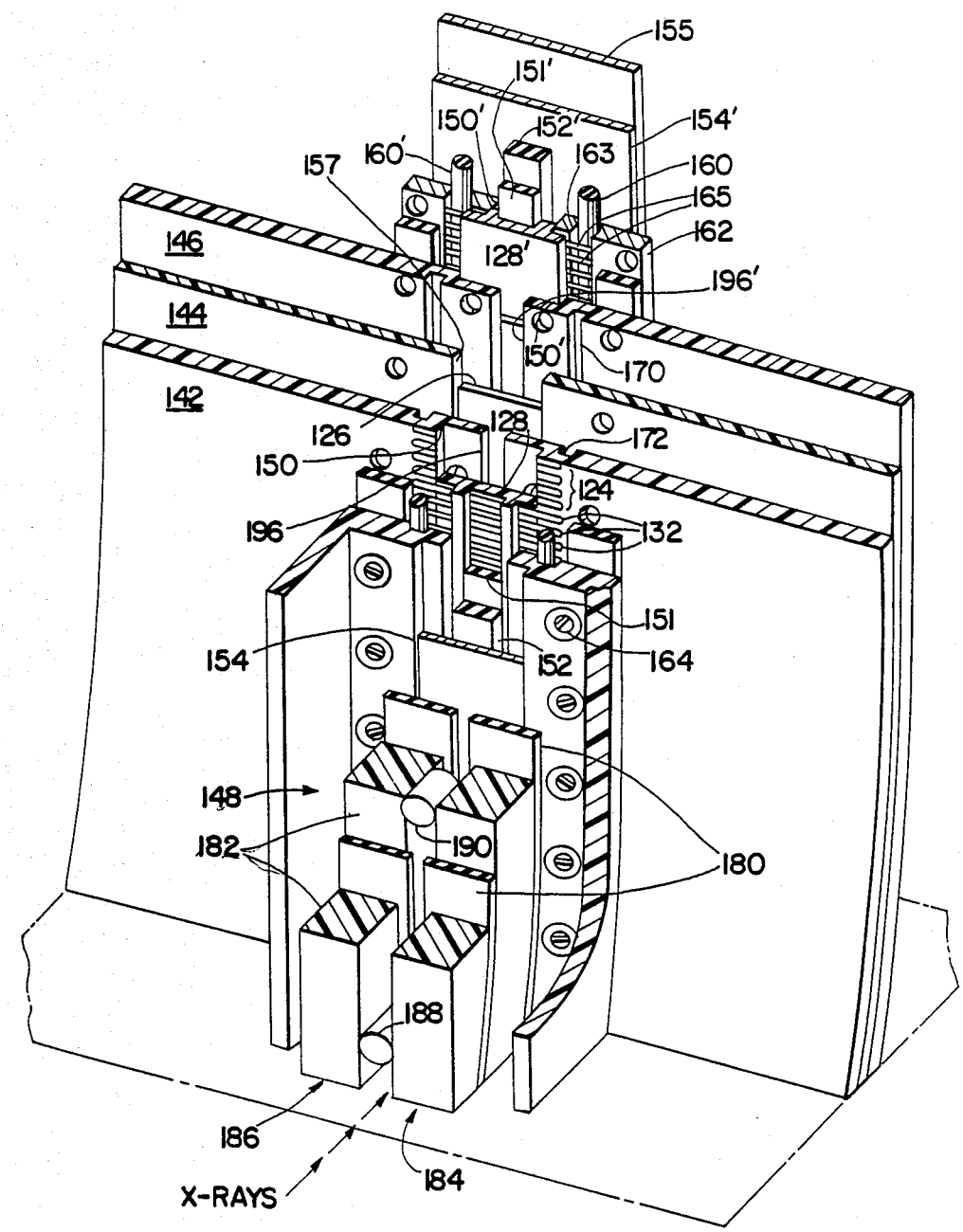
FIG. 9 is an exploded view illustrating in detail a portion of the system shown in FIGS. 7 and 8.

In practice, the photodiode arrays, scintillation phosphor materials, and related components are assembled onto motherboard 80 which is held in a curved configuration by appropriate support structure, such as curved ribs. The motherboard is then assembled using other structural members and a card cage 92, shown very generally in FIG. 4, and in more detail in FIG. 5, to create the entire detector assembly. The focused aft slot collimator is assembled to this detector structure and is suspended in front of the motherboard 80 in appropriate orientation, as illustrated in FIGS. 8 and 9. The array of daughterboards is then inserted in the card cage and plugged into the motherboard, as described in more detail below.

With reference for the moment to FIG. 6, it will be seen that each of the daughterboards 86 is coupled to the convex surface of the curved motherboard 80 by way of a set of 64-pin contacts of known type illustrated generally at 88. Each of the daughterboards 86 extends radially outwardly from the center of the cylinder defined by the curvature of the motherboard 80.

The curved motherboard 80 defines a radius of curvature of approximately 51.5". As will be discussed in more detail below, each of the detector element comprises a photodiode, and the elements are arranged in a linear array having center-to-center spacing of approximately 0.45 mm. The total thickness of the motherboard 80 is approximately 0.155 inches.

In the parlance of modern electronics, the printed circuit board portions comprising the daughterboards 86 are often referred to as "cards", and that designation will be used from time to time in this description to refer to the daughterboards 86.

Referring again to FIG. 4, the detector assembly also includes a card cage structure 92 fixed relative to the motherboard 80, whose function is simply to hold the mounted plurality of daughterboards rigid with respect to the motherboard 80. The card cage 92 includes a frame structure, which bears a plurality of slot defining structures for slidingly accommodating placement of the daughterboards 86 therein, and facilitating their respective plugging into the appropriate connectors on the motherboard 80.

As will be described in more detail below, the motherboard 80 bears printed circuitry on both its inner, or convex side, facing the incoming x-rays, and also on its convex, or outer side, facing the daughterboard cards.

The motherboard 80 has a width of approximately 15 inches, as described in FIG. 4, and its length is defined by a chord extending across the motherboard from top to bottom approximately 20 inches in length.

Figure 5:
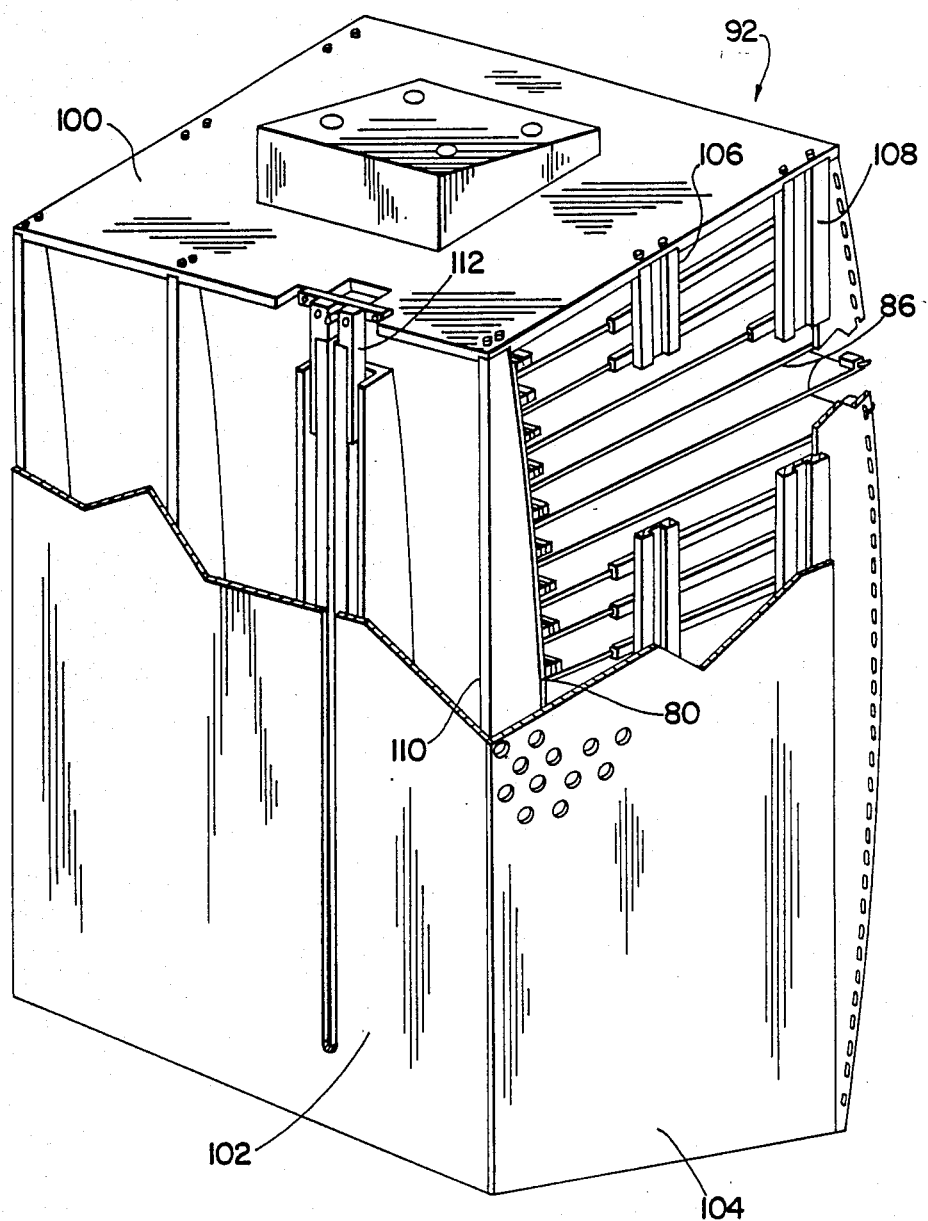
FIG. 5 is a more detailed perspective drawing illustrating the portion of the system illustrated in FIG. 4.

Referring to FIG. 5, the detector assembly card cage 92 includes a top plate 100, a front plate and primary light seal 102 and side plates such as indicated at 104. The card cage maintains the daughterboards 86 in a fixed relation and coupled to the motherboard 80. The plate structures referred to above are supported by middle support frame structure 106, rear support frame structure 108 and front support structure 110. A collimator assembly 112 is provided, which is aligned with the recessed portion 84 of the motherboard 80 along which are arranged the array of detector elements.

As mentioned above, electrical signals from the photodiode arrays are directed to printed circuitry borne on the motherboard 80. The motherboard printed circuitry directs the signals to dedicated amplifier, digitizer and multiplexer circuit networks borne on the daughterboards 86. Each of the daughterboards cards is designed as a stand-alone subset of the detector system and detects and processes signals from 64 discrete detector elements. Digital information output is controlled by a 33rd printed circuit daughterboard (not shown) which acts as a "traffic cop". The 33rd daughterboard is a communication director for output from the detector system. The circuitry referred to as borne on the 33rd daughterboard can be provided in any of a large number of specific embodiments by those of ordinary skill in the relevant art.

Figure 7:
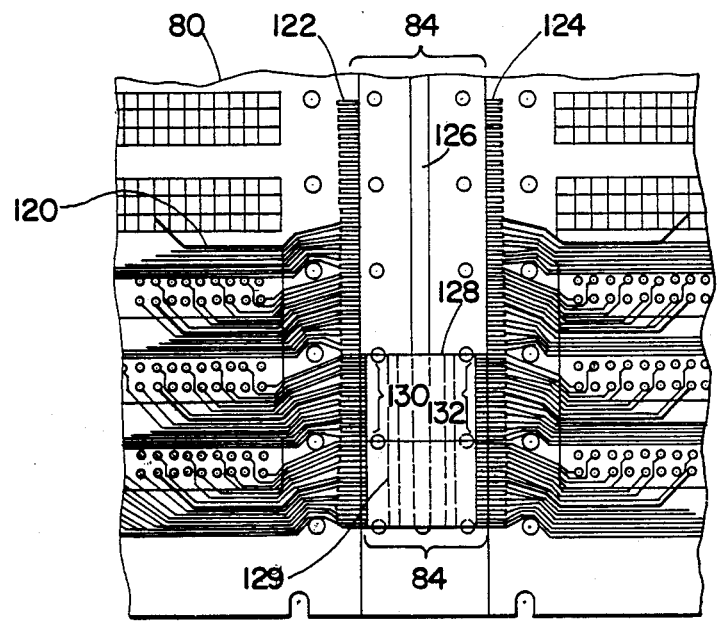
FIG. 7 is an elevational view of a portion of the embodiment illustrated in FIG. 6.

FIG. 7 is a plan view of a broken away portion of the motherboard 80 illustrating in more detail assembly of the detector arrays, and of the recessed portion of the motherboard indicated by the brackets 84.

In FIG. 7, the x-ray energy is incident upon the motherboard from a source located above the plane of the paper.

The motherboard 80 bears on both sides printed circuitry 120 for electrically coupling the outputs from the detector arrays to the daughterboard connectors 88.

As described in more detail below, the motherboard 80 comprises a three layer laminated printed circuit board construction. Near the center of the recessed portion 84, as shown in FIG. 7, the middle, or spacer board is cut away to define a slot 157 parallel to the plane of the paper in FIG. 7 (shown in FIGS. 8 and 9) for accommodating a radiation filter portion 126. See FIGS. 8-9. As explained in more detail below, the radiation filter portion is interposed between the front and back detector arrays.

Each of the detector arrays comprises a plurality of integrated circuit chips such as shown at 128. Each of the circuit chips 128 includes a linear array, arranged vertically as shown in FIG. 7, of individual photodiode detector elements. The center-to-center spacing between these uniformly spaced photodiode detector elements is approximately 0.45 mm. Chips suitable for use in this environment are commercially available and are selectable by one of ordinary skill in the art.

For purposes of clarity, only two chips 128, 129 are illustrated in FIG. 7. In the preferred embodiment, however, each detector array comprises 32 such chips arranged so that their respective photodiode detector elements are collectively disposed in a linear pattern in the region of the filter element 126.

Also, and as explained in more detail below, there are two arrays of 32 chips each, one arranged behind the other. Thus, with reference to FIG. 7, for each chip such as 128 as shown in FIG. 7, there is another chip which is not visible in FIG. 7, and which is located on the opposite side of the motherboard 80 with respect to the filter element 126.

The printed circuitry 120 on each side of the motherboard 80 is coupled to the detector elements of chips 128 by way of two arrays 122, 124 of gold or gold plated contact terminals which are defined on the surface of the motherboard.

The contact terminals 122, 124 are spaced generally away from the edges of the board.

Each of the chips 128 comprises a plurality of sets 130, 132 of contact fingers, also gold plated, each of which is electrically coupled to receive the output of a given different photodiode detector element of the chip 128. The contact elements 122, 124 are spaced uniformly along the motherboard with a spacing corresponding to the spacing of the sets 130, 132 of the contact fingers of the chip 128. Contact is made between the respective contact fingers and the contact terminals by appropriately locating the chip 128 such that each of its contact fingers is in spatial registration with a different one of the contact terminals of the sets 122, 124. A means for facilitating durable maintenance of this contact is discussed below.

FIG. 8 is a cross-sectional view of the portion of the detector assembly illustrated in FIG. 7, taken in a plane perpendicular to the motherboard as shown in FIG. 7 and extending through the chip 128. In FIG. 8, the x-rays are incident on the detector assembly in a direction indicated by an arrow 140.

Referring to FIGS. 8 and 9, the motherboard 80 is illustrated as a three layer laminated structure. Each layer comprises the material referred to above as POLYCLAD-F.

The motherboard 80 comprises a front detector array printed circuit board 142, a middle spacer board 144 and a rear detector array printed circuit board 146. The front and rear circuit boards 142, 146 are each approximately 0.062 inches in thickness. The middle spacer board 144 is approximately 0.031 inches in thickness. The three layers of the motherboard are bonded together by a suitable adhesive.

The front circuit board 142 bears printed circuitry for routing signals from the front detector array, to the daughterboard connectors 88. The rear circuit board 146 bears other printed circuitry for routing the output signals from the rear detector array, the arrays to daughterboard connectors.

The thickness and rigidity of the motherboard laminate structure 80 enables the motherboard to be used not only for bearing the associated circuitry responsive to detector element output signals, but also to constitute a structure sufficiently rigid to contribute to the support of the detector arrays in a rigid desired mutual geometrical configuration. In this embodiment, that configuration is represented by two curved arrays of detector elements, the curvature of the arrays being defined by the curvature of the motherboard, with one array arranged behind the other, in the geometrical arrangement depicted generally in FIG. 3.

One detector element chip of each array is illustrated in cross-section in FIG. 8. In FIG. 8, chip 128 comprises a portion of the front array of detector elements, and chip 128' comprises a portion of the rear detector array. Collimator structure 148 is placed upstream of the detector assembly active elements, with respect to the direction of the x-rays as shown by the arrow 140.

The depth of the recessed portions, or troughs, of the front and rear circuit boards, as illustrated at 150, 150', (FIG. 9 also) in which the chips 128, 128' are respectively positioned, is such that the contact fingers such as 132 of each chip, lie approximately flush with the outer surface of the circuit boards 142, 146 in aligned relationship with contact terminals 122, 124.

The filter portion 126 is slidably positioned within the slot structure 157 (FIG. 9) defined by the middle spacer board 144, to facilitate removal and replacement of the filter element with another type or thickness of filter element, in order to "tune" the detector to various energy levels or studies, to optimize the results of the particular studies for which the system is to be used. The slot 157 is about one half inch wide.

Substitute filter materials and thicknesses can be suitably selected in accordance with the criteria explained in detail in the above incorporated European patent application to Barnes.

The scintillation phosphors are illustrated in FIGS. 8 and 9 at 151, 151'. The phosphor 151 is preferentially responsive to x-ray energy in a lower energy range. The phosphor 151' is preferentially responsive to x-ray energy of a higher energy range. The phosphors 151, 151' are substantially uniform in thickness. The phosphor materials or the phosphor portions 151, 151' are selected from materials whose qualitative properties define their preferential energy response. While the preferred embodiment illustrates the phosphors 151, 151' as being of equal thickness, it is contemplated that, in situations in which one might wish to tailor a modified response characteristic to energies of various levels, different phosphor thicknesses could be used. For example, the higher energy absorptive phosphor 151' could be made thicker than the phosphor 151, in order to heighten its preferential response to higher energy radiation.

Novel means is provided for holding the phosphor materials in place, while still facilitating the replacement of the phosphors 151, 151' with substitute portions of phosphor materials, having differing characteristics where desired. The means for removably holding the phosphors 151, 151' in place comprises portions of resilient foam tape 152, 152'. Each portion of foam tape 152, 152' is affixed to its corresponding portion of phosphor material by an adhesive. The adhesive, while pressure sensitive for holding the phosphor material to the foam tape, also permits separation of the foam tape and the phosphor where desired by simly peeling the tape from the phosphor.

The side of each portion of foam tape 152, 152' facing away from the phosphor material is similarly affixed to a light shield element 154, 154', respectively.

In the preferred embodiment, the foam tape comprises double sided foam tape 3 millimeters in thickness, and the adhesive made by the 3M Company of St. Paul, Minn., U.S.A.

In the preferred embodiment, the phosphor portions 151, 151' can be changed by removing the light shields 154, 154', along with the respectively adhered foam tape portions and phosphor portions, peeling the phosphor from the foam tape and readhering the foam tape to a different phosphor portion, and replace the substituted phosphors and foam tape.

The light shields 154, 154' each comprise a portion of polystyrene approximately 0.5 millimeters in thickness.

A radiation attenuator backplate 155 comprises a sheet of lead approximately 1.5 millimeters in thickness whose function is to substantially totally absorb any remaining radiation which passes through both the front and rear detector arrays.

Novel structure is also provided for maintaining contact between the terminals such as 122, 124 on the surface of the motherboard 80 (see FIG. 7) and the contact fingers, such as 130, 132 extending from the sides of each of the chips. This structure includes silicone pressure members such as 160, a surface connection brackets such as 162 and fasteners such as 164, in FIG. 9. The silicone pressure member 160 comprises an elongated piece of round, resilient silicone which is laid on top of the fingers such as 132. The surface connection bracket 162 defines a recessed portion 163 for accommodating and holding the silicone pressure member 160. The surface connection bracket maintains the pressure member 160 in continuous pressure contact with the contact fingers such as 132, causing them to impinge upon respective ones of the contact terminals, 122, 124, by way of pressure applied by the fastener 164 such as a screw.

This structure facilitates maintaining a pressure contact between the fingers and the terminals. While temporary adhesive means may be used to assist in the initial alignment of the chip with its fingers in registration with the corresponding contact terminals, the contact maintained between the fingers and the terminals is substantially only dependent upon pressure imposed by the pressure member and connection bracket assembly. This structure facilitates the convenient disassembly of the detector for repair or other purposes. All that is needed to remove the chips is to disconnect the surface connection bracket and remove the pressure member, which frees up an entire side of the chips of an array.

No soldering, welding or plugs are required to maintain the coupling between the fingers and the contact terminals. No additional conductive material need be placed between the fingers and the terminals. Preferably, the pressure member is made of an insulative material.

For purposes of clarity and the avoidance of obfuscation of the drawing, reference characters are applied to only one pressure contact assembly in FIGS. 8 and 9, i.e., the assembly appearing in the upper right portion of FIG. 8. It is to be understood, however, that a pressure member is applied on both sides of each array, in order to maintain the desired pressure contact between the finger sets on both sides of each chip array and the respectively associated contact terminals on the motherboard 80. Similarly, this coupling apparatus is provided for both the front and rear arrays. Thus, in a given detector assembly, there will be four pressure members, four surface connection brackets and an appropriate number of fasteners. Preferably, each pressure member is sufficiently long to extend along and maintain the contacts of all the fingers on a corresponding side of a detector array, for all chips of that array. Thus, only two elongated pressure members are employed for each array of detector elements.

In the preferred embodiment, the amount of pressure applied by the pressure member such as 160 on the contact fingers can be adjusted by the interposition of a spacer element, such as 166, between the surface connection bracket 162 and the adjacent motherboard surface. In the preferred embodiment, the spacer 166 is made of the material referred to by the trademark Teflon, and its thickness is chosen in order to establish a degree of pressure on the contacts 132 at approximately four pounds per lineal inch.

Referring in particular to FIG. 9, lamination of the layers 142, 144, 146 of the motherboard 80 is facilitated by the provision, in layers 142 and 146 of glue slots of kerfs 172, 170, respectively, which reduces undue spreading of the adhesive substance by accumulating excessive adhesive use to bind the layers together. The glue slots prevent migration of adhesive into slot 157.

FIGS. 8 and 9 illustrate an aft collimator assembly incorporating an adjustable aspect ratio.

The focused aft slot collimator assembly 148 incorporates tantalum for rejecting scatter radiation because that material has a relatively high atomic number and yet has very good mechanical properties which insure that the collimator will resist damage in fabrication and handling and will maintain physical integrity during assembly and service.

Good scatter rejection requires that a fairly thick collimator be used. To permit ease of manufacture of the thick tantalum structure, thin (approximately 0.5 millimeter) tantalum strips 180 are sandwiched between two pieces 182 of aluminum that have been machined to the desired focus consistent with the radius of curvature of the focused detector array. Each side 184, 186 of the collimator is first assembled and then the two the collimating edges of tantalum strips are machined simultaneously to assure that they are flat and parallel with each other.

The spacing of the two sides of the focused collimator is adjustable to allow for adjusting the width of the collimator slit. Two gage pins 188, 190 are used for slit with adjustment. The pins are installed at each end of the collimator assembly and, depending on the gage diameter of the pins, the collimator is adjusted to the desired opening. The collimator is mounted to the remainder of the detector assembly by known adjustable holding structure.

The method of fabrication of the motherboard is noteworthy because it is quite large, thick, dense, hollow in the center and has over two thousand gold plated contacts in the middle of the board, in addition to it being curved. The fabrication process is outlined step by step as follows:

1. A 0.31 inch thick piece of printed circuit board material such as described above, and constituting the spacer layer 144, is provided with all conductive material removed from its surface. This layer is then machined to provide the slot 157 (FIG. 9) for accommodating the filter 126.

2. Two pieces 142, 146 of 0.061 inch thick printed circuit board material of the type described above are prepared by trimming to size and machining glue slots, or kerfs, such as 170, 172 on the nonconductive sides of the boards.

3. The spacer board 144 is sandwiched between the nonconductive surfaces of the front and rear boards 142, 146 with sheets of adhesive placed between mating surfaces extending from outer edges to the glue slots. The three boards are respectively aligned using alignment holes.

4. The sandwich of boards is laminated using pressure and heat in a conventional process.

5. The laminated assembly is then subjected to known printed circuit board manufacturing methods. In this instance, however, the motherboard 80 is provided with printed circuitry on both its outer sides. Worth noting is that production of the gold plated contact terminals such as 122, 124, in the center of the board is facilitated by joining all individual contact terminals by using a common bus which is terminated at the edge of the board. Thus huge card electrolysis plating techniques can be used to gold plate these contacts. All necessary holes are plated through.

6. The laminated assembly is trimmed to final size and the hollow middle section defined by the slot 194 is now accessible.

7. After the production of the printed circuits, the troughs 150, 150' described above are machined into the opposite outer surfaces of the motherboard layers 142, 146, while simultaneously the common bus is removed by the machining, thus resulting in the provision of discrete photodiode contact terminals such as 122, 124. A steel support strip (not shown) is inserted into the hollow section defined by the slot 157 prior to machining the troughs to prevent undesirable deformation of the board material as a result of tool pressure.

8. Transverse supports are then attached to each end of the motherboard and a 0.16 inch wide slot 196, 196' is then machined completely through the board, i.e. through each of the layers 142, 146. 9. The laminated board is then formed into the desired curvature using forming fixtures in known fashion which are permanently attached to the motherboard and become part of the detector system structure. In practice, 8 curved ribs are attached to the motherboard to hold it in a curved configuration. Two end plates assist in this. After the motherboard assembly is subsequently completed, 5 of the ribs are removed, the remaining 3 ribs becoming a permanent part of the assembly to maintain the curvature. Once curved, the motherboard need not be straightened or flexed during subsequent assembly processes.

10. All necessary output connectors, such as at 88, for conducting signals from the printed circuitry to the downstream processing components are then soldered to the boards. Known wave soldering techniques are used.

Tests have shown that, in volume production, it may be desirable to reverse steps 9 and 10 above, since wave soldering can be facilitated by performing the soldering on a flat board.

The alignment of each photodiode array is accomplished in the following visual manner: the front photodiode array chips such as 128 are positioned in the front trough 150 of the motherboard by visually aligning each end of the array with alignment holes that are accurately machined into the motherboard troughs at the proper pitch, or spacing. When all 32 chips are in position, a visual scan is made to be sure spacings are uniform. Some of the contact fingers of the front set of photodiode chips are then adhesively bonded in position as previously described, for positioning purposes.

Then the 32 rear photodiode chip arrays are placed in the rear trough 150' and each edge of these arrays is visually aligned with a corresponding edge in the front array using an optical edge alignment procedure. Thus it can be insured that the detectors in the rear array are superimposed on the front detectors. Realizing that each detector generates a pixel value, this procedure essentially assures pixel-to-pixel alignment and avoids the need to perform pixel re-registration during subsequent processing.

The motherboard 80 is fabricated with the 0.031 inch by 0.500 inch hollow slot section 157 between the photodiode troughs which permits the beam hardening filter member 126 to be inserted for purposes described above. The slot is so designed to facilitate removal of this filter without disassembly of the unit.

Troughs 150, 150' are machined into the front and rear sides of the motherboard 80 before the photodiode arrays are assembled. The depths of the troughs 150, 150' are such that the plane of the contact fingers 130, 132 of the photodiode arrays, when the arrays lie in the troughs, is substantially coincident with the plane of the gold plated motherboard contact terminals such as 122, 124. This permits electrical contact between the photodiodes and the motherboard to be made without the need for bending the photodiode array contact fingers.

The arrays are assembled in the following manner: the photodiode arrays are placed in the troughs 150, 150' in the motherboard. Each contact finger of each photodiode array is placed over the corresponding motherboard contact terminal. A controlled amount of adhesive, comprising a material designated by the trademark LIGHTWEL 181, made by Americal Chemical and Engineering Co., of Torrington, Conn., U.S.A. is applied to the end of the photodiode finger to effect a bond to the motherboard contact in order to assure that alignment is maintained during the assembly process.

Optionally, a thin (one mil.) layer of insulation (not shown) is placed over the rows of contact fingers to insulate the electrical connections between the fingers and the contacts from impinging structure. A teflon insulator is placed over each of the four rows of contacts to insulate the electrical contacts from the surface connection brackets which are made of aluminum.

The resilient pressure member such as 160 is then installed in one of the surface connection bracket recesses 163. The bracket is then assembled to the motherboard using screws, to form a clamp. The brackets, in conjunction with the pressure members, are designed to exert a controlled and predetermined contact force of four pounds per linear inch to the electrical junction between each of the contact fingers and the corresponding gold plated contact terminals on the motherboard. The contact force, i.e., contact pressure, is governed by controlling the depth of the recess groove such as 163 as well as by the spacer 166, and the diameter and resiliency of the pressure member, thereby controlling the amount of deformation of the resilient pressure element is thus controlled. The compressuive force exerted by the screws need have no bearing on the maximum contact pressure force applied to the electrical connections.

As discussed above, at the time the photodiode troughs are machined into the front and rear outer surfaces of the motherboard, 0.16 inch slot regions 196, 196' extending the length of the active photodiode array are machined completely through the boards 142, 146.

This negates any concern for having to account for small, but perhaps nonuniform, attenuation artifacts that might occur if the printed circuit board material of the motherboard were not removed from the x-ray path. Also, the remote but possible chance that a flake of high atomic number material could be trapped in this critical region during the lamination process is avoided by removal of this region of material. Encapsulation, or permanent installation of the radiation filter element 126 during lamination would make it extremely difficult to remove this slot 196, 196' of circuit board material.

It is to be understood that other types of electronic radiation detector systems, such as ion chambers, CCD array devices, or semiconductor detectors, converting x-rays directly to electric signals, could be incorporated into the design of the detector system described here, and employed in a manner analogous to that in which the present embodiment uses the scintillator/photodiode radiation detection detector elements.

It is also noted that those of ordinary skill may be able to incorporate onto the motherboard the circuitry of the daughterboards, using hybrid technology, thus minimizing size, weight and complexity of the design.

This invention is not limited to linear detector arrays. The principles of the invention may be analogously applied to form detector systems employing multiple rows and columns of detector elements.

It is to be understood that the present description of the preferred embodiment of this invention is intended as illustrative, rather than exhaustive, of the invention's subject matter. It is to be further understood that those of ordinary skill in the relevant art may make certain additions, or modifications to the embodiment disclosed herein, without departing from the spirit or the scope of the invention as defined in the appended claims.

We claim:

1. A radiographic system comprising:
   (a) a source of body-penetrative radiation;
   (b) a penetrative radiation detector assembly;
   (c) structure for supporting the source and detector assembly in a spaced relationship;
   (d) said detector assembly comprising:
      (i) a circuit board having a bowed configuration and bearing circuitry defined thereon;
      (ii) first and second arrays of detector elements arranged one behind the other radially with respect to said bowed configuration and being supported on said circuit board material, at least some of said detector elements being electrically connected to said circuitry defined on said board, and
   (e) processing circuitry coupled to said circuit board circuitry for cooperatively producing an image of radiuation when said radiation is incident on said first and second detector element arrays.

2. The system of claim 1:
   said circuit board having a configuration defining a portion of a cylinder.

3. The system of claim 1, further comprising:
   (a) a piece of radiation filter material, and
   (b) said circuit board material defining a space between said first and second arrays, said space being configured for slidably receiving therein said radiation filter material portion.

4. A digital radiography system comprising:
   (a) a source of body-penetrative radiation;
   (b) a dual layer, dual energy detector assembly;
   (c) structure for supporting said source and said detector assembly in a spaced relationship with the detector assembly facing the source;
   (d) said detector assembly comprising:
      (i) a bowed portion of circuit board material bearing board circuitry;
      (ii) a dual layer array of detector elements mounted on said circuit board material and being connected to said board circuitry, said dual layers being positioned one behind the other radially with respect to said bowed configuration and
   (e) processing circuitry coupled and operative with said board circuitry for producing an image of radiation when said radiation is incident on said detector element array.

5. A radiation imaging system comprising:
   (a) a radiation source;
   (b) a detector assembly spaced from and positioned to receive radiation from said source, said detector assembly comprising:
      (i) a portion of flexedly curved circuit board material bearing board circuitry borne on a board surface, said board circuitry having electrical terminals defined on the board surface and spaced from the board edges;
      (ii) a dual layer array of detector elements fixed relative to the board surface and including contact elements geometrically arranged for electrically contacting said electrical terminals of said board circuitry, said layers being located one behind the other radially with respect to said curvature and
   (c) processing circuitry coupled to and cooperative with said board circuitry for producing a representation of an image of radiation when said radiation is incident on said detector array.

6. A radiation imaging system comprising:
   (a) a source for propagating penetrative radiation along a path;
   (b) a light sensitive detector element interposed in said path and spaced from said source, said light sensitive element producing an electrical output signal in response to sensing light;
   (c) a converter element for converting penetrative radiation to light, said converter element aligned in said path and with said light detecting element and being positioned downstream in said path with respect to said light detecting element, such that radiation from said source penetrates through said light detecting element prior to impinging upon said converter element, said light detector being responsive to light from said converter element, and
   (d) means coupled to said light detecting element for producing from said electrical output signal from said light detecting element a representation of radiation when said radiation is incident upon said converter element.

7. A radiation imaging system comprising:
   (a) a source for propagating penetrative radiation along a path;
   (b) a detector assembly aligned in said path and spaced from said source, said detector assembly comprising:
      (i) a relatively thick bowed circuit board;
      (ii) a first radiation detector element affixed to one side of said circuit board;

(iii) a second radiation detector element affixed to a second side of said circuit board, and aligned with said first detector element relative to said source, and radially aligned with respect to said bowed circuit board, and (c) means coupled to said detector elements to produce an image representation of radiation when said radiation is incident on said first and second detector elements.

8. A detector assembly comprising:
(a) a relatively thick circuit board, said circuit board defining:
  (i) a first trough in one side thereof;
  (ii) a second trough in the opposite side of said circuit board aligned with said first trough;
  (iii) a slot cut entirely through said circuit board, said slot being parallel to and generally aligned with said first and second troughs;
(b) a first photodiode array at least partially recessed within said first trough;
(c) a second photodiode array at least partially recessed in said second trough;
(d) first scintillation material affixed proximate said first photodiode array;
(e) second scintillation material affixed proximate said second photodiode array;
(f) printed circuitry borne on both sides of said circuit board; and
(g) means for coupling said first and second photodiode arrays to said first and second printed circuitry.

9. A detector assembly comprising:
(a) a relatively thick circuit board, said circuit board defining:
  (i) a first trough in one side thereof, and
  (ii) a second trough in the opposite side of said circuit board aligned with said first trough;
(b) a first photodiode array at least partially recessed within said first trough;
(c) a second photodiode array at least partially recessed in said second trough;
(d) first scintillation material affixed proximate said first photodiode array;
(e) second scintillation material affixed proximate said second photodiode array;
(f) printed circuitry borne on both sides of said circuit board, and
(g) means for coupling said first and second photodiode arrays to said printed circuitry.

10. The detector of claim 9 further comprising: said circuit board defining a bowed configuration.

11. The detector of claim 9, further comprising:
(a) an elongated piece of radiation filter material having physical properties to enable beam hardening, and
(b) said circuit board comprising structure defining a slot for slidably accommodating said filter material between said first and second photodiode arrays.

12. A dual energy detector assembly comprising a motherboard curved to define a portion of the surface of a cylinder, a concave surface of said motherboard facing a source of penetrative radiation, said motherboard comprising;
(a) a first board for mounting a first detector array, said first board bearing printed circuitry including a set of conductive terminals for electrical connection to said first detector array and a recessed portion to accommodate a portion of the first detector array;

(b) a second board for mounting a second detector array in alignment with the first array on a side opposite the radiation source, said second board bearing printed circuitry including a set of conductive terminals for electrical connection to said second detector array and a recessed portion to accommodate a portion of the second detector array; and (c) an intermediate board sandwiched between said first and second boards and defining a slot for selectively positioning a radiation filter element between said first and said second detector arrays.

13. The assembly of claim 12 additionally comprising a plurality of daughterboards mounted to a convex surface of the motherboard and each bearing printed circuitry for electrical coupling with the printed circuitry borne by the motherboard.

14. The assembly of claim 12 additionally comprising:
(a) a first array of detector elements mounted to said first board, said first array including a set of conductive leads respectively alignable in registration with said set of conductive terminals of said first boards; and
(b) a second array of detector elements mounted to said second board, said second array including a set of conductive leads respectively alignable in registration with said set of conductive terminals of said second board.

15. The assembly of claim 14 wherein said first detector array is preferentially responsive to a first energy range and said second detector array is preferentially responsive to a second energy range.

16. The assembly of claim 14 additionally comprising detector mounting means including:
(a) a member comprising resilient, electrically insulative material separate from said terminals and leads of said first and second boards and positioned to mechanically press said conductive leads of said first and second boards into engagement with said respective conductive terminals of said first and second boards; and
(b) means for applying a predetermined force to said resilient member and for maintaining said resilient member in position with respect to said leads and terminals of said first and second boards.

17. The assembly of claim 12 additionally comprising a radiation attenuator backplate mounted on a side of said second board to intercept radiation passing through said second detector array.

18. The assembly of claim 14 additionally comprising:
(a) first and second elongated pieces of radiation sensitive phosphor material, and
(b) means for removably fixing each of said pieces in a position proximate a respective one of said first and second detector array elements.

19. The assembly of claim 18, additionally comprising:
a light shield means affixed to each of said first and second phosphor pieces each on a side of said phosphor piece opposite said first and second detector array elements.

20. A radiation detector assembly comprising:
(a) a first circuit board curved to form a concave and a convex surface, said concave surface facing a source of body penetrative radiation;
(b) printed circuitry including a set of conductive terminals borne on each of the concave and convex surfaces of said first board;

(c) a first trough adjacent said printed circuitry borne on the concave side of said first board;

(d) a second trough adjacent said printed circuitry borne on the convex side of said first board and in alignment with said first trough;

(e) a first detector array preferentially responsive to a first radiation energy range, said first array including a set of conductive leads alignable in registration with said set of conductive terminals borne on the concave surface of said first board and at least partially recessed in said first trough;

(f) a second detector array preferentially responsive to a second radiation energy range, said second array including a set of conductive leads alignable in registration with said set of conductive terminals borne on the convex surface of said first board and at least partially recessed in said second trough; and (g) means for maintaining electrical contact between the sets of leads of said first and second detector arrays and the respective set of conductive terminals of said first and second arrays, said maintaining means including a resilient, electrically insulative member located opposite said printed circuitry with respect to at least one of said conductive lead sets and positioned to mechanically press said conductive lead set into electrical contact with said conductive terminals.

21. The detector assembly of claim 20 additionally comprising means defining a slot positioned between said first and second troughs for selectively accommodating a radiation filter between said first and second detector arrays.

22. The detector assembly of claim 20 wherein said first and second detector arrays comprise an array of detector elements and an elongated piece of flexible, radiation sensitive phosphor material removably adhered proximate said array of detector elements.

23. The detector assembly of claim 20 additionally comprising a plurality of second circuit boards mounted to the convex surface of said first circuit board, each of said second boards bearing printed circuitry in electrical contact with said printed circuitry borne on the convex and concave surfaces of said first board.

24. A dual energy detector assembly comprising a motherboard curved to define a portion of the surface of a cylinder, a concave surface of said motherborad facing a source of penetrative radiation, said motherboard comprising;

(a) a first board bearing a first detector array, said first board bearing printed circuitry including a set of conductive terminals for electrical connection to said first detector array and a recessed portion to accommodate a portion of the first detector array;

(b) a second board bearing a second detector array in alignment with the first array on a side opposite the radiation source, said second board bearing printed circuitry including a set of conductive terminals for electrical connection to said second detector array and a recessed portion to accommodate a portion of the second detector array; and (c) an intermediate board sandwiched between said first and second boards and defining a recess between said first and second detector arrays;

(d) a piece of x-ray attenuating radiation filter material, and (e) structure defined at least in part by said recess of said intermediate board for slidably engaging and holding said filter material between said first and second detector arrays.

25. The assembly of claim 24, further comprising:

(a) said filter material comprising a relatively thin layer of filter material, and (b) said engaging and holding structure comprising material located between said arrays and defining a slot in which said filter material is slidably engageable.

26. A radiation imaging system comprising:

(a) an x-ray source including apparatus cooperative with said source for producing a thin planar fan beam of radiation for projection through a subject along a beam path, said x-ray source defining a focal spot from which x-ray energy primarily emanates;

(b) a dual energy x-ray detector assembly comprising:
  (i) a first curved array of x-ray detector elements defining a first radius of curvature and being focused substantially on said focal spot, said array including a set of conductive leads;
  (ii) a second curved array of x-ray detector elements defining a second radius of curvature greater than said first radius of curvature, said second curved array being focused substantially on said focal spot and including a set of conductive leads;
  (iii) a circuit board curved to define a portion of a cylinder and having a concave surface bearing printed circuitry including a set of conductive terminals for mounting said first detector array and whose radius of curvature is substantially equal to said first radius of curvature and having a convex surface bearing printed circuitry including a set of conductive terminals for mounting said second detector array in alignment along the beam path with said first array and whose radius of curvature is substantially equal to said second radius of curvature.

27. The system of claim 26 wherein said detector assembly additionally comprises a slot positioned between said first and second detector arrays for selectively accommodating radiation filter material.

28. A dual energy detector assembly comprising a motherboard curved to define a portion of the surface of a cylinder, a concave surface of said motherboard facing a source of penetrative radiation, said detector assembly comprising;

(a) a first board for mounting a first detector array, said first board bearing printed circuitry including a set of conductive terminals for electrical connection to said first detector array and a recessed portion to accommodate a portion of the first detector array;

(b) a first array of detector element mounted to said first board, said first array preferentially responsive to a first energy range and including a set of conductive leads respectively lineable in registration with said set of conductive terminals of said first board;

(c) a second board for mounting a second detector array in alignment with the first array on the side opposite the radiation source, said second board bearing printed circuitry including a set of conductive terminals for electrical connection to said second detector array and a recessed portion to accommodate a portion of the second detector array;

(d) a second detector array of detector elements mounted to said second board, said second array preferentially responsive to a second energy range and including a set of conductive leads respectively lineable in registration with said set of conductive terminals of said second board;

(e) an intermediate board sandwiched between said first and second boards and defining a slot for selectively positioning a radiation filter element between said first and said second detector arrays;

(f) detecting mounting means including a resilient, electrically insulative member positioned to mechanically press said conductive leads of said first and second detector arrays into electrical contact with said respective conductive terminals of said first and second boards and means for applying a predetermined force to said resilient member and for maintaining said resilient member in position with respect to said leads and terminals of said first and second boards; and (g) a plurality of daughterboards mounted to a convex side of the motherboard and each bearing printed circuitry for electrical coupling with the printed circuitry borne by the motherboard.

* * * * *